United States Patent
Malkin et al.

(10) Patent No.: US 9,118,469 B2
(45) Date of Patent: Aug. 25, 2015

(54) REDUCING ELECTROMAGNETIC INTERFERENCE IN A RECEIVED SIGNAL

(75) Inventors: Moshe Malkin, Mountain View, CA (US); Jose Tellado, Mountain View, CA (US)

(73) Assignee: Aquantia Corp., Milpitas, CA (US)

( * ) Notice: Subject to any disclaimer, the term of this patent is extended or adjusted under 35 U.S.C. 154(b) by 336 days.

(21) Appl. No.: 12/789,728

(22) Filed: May 28, 2010

(65) Prior Publication Data

US 2011/0296267 A1  Dec. 1, 2011

(51) Int. Cl.
*H04B 1/10* (2006.01)
*H04L 5/16* (2006.01)
*H04L 25/02* (2006.01)

(52) U.S. Cl.
CPC .............. *H04L 5/16* (2013.01); *H04L 25/0276* (2013.01)

(58) Field of Classification Search
CPC ............ H04B 3/30; H04B 15/00; H04B 1/10; H04B 1/1036; H04B 1/123; H04L 27/2647; H04L 25/0276
USPC .......................................... 375/219, 349, 350
See application file for complete search history.

(56) References Cited

U.S. PATENT DOCUMENTS

| | | | |
|---|---|---|---|
| 3,506,906 A | 4/1970 | Nestor | |
| 3,671,859 A | 6/1972 | Miller | |
| 4,797,902 A * | 1/1989 | Nishiguchi et al. | 375/245 |
| 4,870,370 A * | 9/1989 | Hedberg et al. | 330/133 |
| 5,157,690 A | 10/1992 | Buttle | |
| 5,283,811 A | 2/1994 | Chennakeshu et al. | |
| 5,550,924 A * | 8/1996 | Helf et al. | 381/94.3 |
| 5,777,692 A | 7/1998 | Ghosh | |
| 5,832,032 A | 11/1998 | Overbury | |
| 5,889,511 A * | 3/1999 | Ong et al. | 345/173 |
| 5,910,960 A * | 6/1999 | Claydon et al. | 714/784 |
| 5,995,566 A | 11/1999 | Rickard et al. | |
| 5,995,567 A | 11/1999 | Cioffi et al. | |
| 6,011,508 A * | 1/2000 | Perreault et al. | 342/350 |
| 6,035,360 A | 3/2000 | Doidge et al. | |
| 6,052,420 A * | 4/2000 | Yeap et al. | 375/346 |
| 6,069,917 A | 5/2000 | Werner et al. | |
| 6,285,718 B1 * | 9/2001 | Reuven | 375/257 |
| 6,385,315 B1 | 5/2002 | Viadella et al. | |
| 6,424,234 B1 * | 7/2002 | Stevenson | 333/182 |
| 6,486,746 B1 | 11/2002 | Gilbert | |

(Continued)

FOREIGN PATENT DOCUMENTS

WO  WO 97/40587  10/1997
WO  WO2011/056970 A2  5/2011

OTHER PUBLICATIONS

U.S. Appl. No. 12/563,938, filed Sep. 21, 2009, Sedarat.

(Continued)

*Primary Examiner* — Shuwang Liu
*Assistant Examiner* — David S Huang
(74) *Attorney, Agent, or Firm* — Lance Kreisman; Peninsula Patent Group (57) ABSTRACT

Embodiments of methods and apparatus for reducing electromagnetic interference of a received signal are disclosed. One method includes receiving a signal over at least two conductors, extracting a common-mode signal from the at least two conductors, processing the common-mode signal, and reducing electromagnetic interference of the received signal by summing the processed common-mode signal with the received signal.

21 Claims, 13 Drawing Sheets

(56) References Cited

U.S. PATENT DOCUMENTS

| | | | |
|---|---|---|---|
| 6,683,913 B1* | 1/2004 | Kantschuk | 375/258 |
| 6,690,739 B1 | 2/2004 | Mui | |
| 6,711,207 B1 | 3/2004 | Amrany et al. | |
| 6,734,659 B1 | 5/2004 | Fortner | |
| 6,771,720 B1* | 8/2004 | Yang et al. | 375/345 |
| 6,924,724 B2 | 8/2005 | Grilo et al. | |
| 6,934,345 B2 | 8/2005 | Chu et al. | |
| 6,959,056 B2 | 10/2005 | Yeap et al. | |
| 6,999,504 B1* | 2/2006 | Amrany et al. | 375/222 |
| 7,026,730 B1 | 4/2006 | Marshall et al. | |
| 7,031,402 B2 | 4/2006 | Takada | |
| 7,103,013 B1 | 9/2006 | Kim et al. | |
| 7,123,117 B2 | 10/2006 | Chen et al. | |
| 7,164,764 B2 | 1/2007 | Zimmerman et al. | |
| 7,173,992 B2 | 2/2007 | Frigon | |
| 7,180,940 B2* | 2/2007 | Li et al. | 375/232 |
| 7,200,180 B2 | 4/2007 | Verbin et al. | |
| 7,315,592 B2 | 1/2008 | Tsatsanis et al. | |
| 7,333,603 B1* | 2/2008 | Sallaway et al. | 379/391 |
| RE40,149 E | 3/2008 | Vitenberg | |
| 7,440,892 B2* | 10/2008 | Tamura | 704/233 |
| 7,457,386 B1* | 11/2008 | Phanse | 375/350 |
| 7,459,982 B2 | 12/2008 | Miao | |
| 7,492,840 B2 | 2/2009 | Chan | |
| 7,522,928 B2 | 4/2009 | O'Mahony | |
| 7,542,528 B1 | 6/2009 | Cheong | |
| 7,634,032 B2* | 12/2009 | Chu et al. | 375/346 |
| 7,656,956 B2 | 2/2010 | King | |
| 7,706,434 B1 | 4/2010 | Farjadrad | |
| 7,708,595 B2 | 5/2010 | Chow et al. | |
| 8,094,546 B2 | 1/2012 | Schenk | |
| 8,139,602 B2 | 3/2012 | Meier | |
| 8,284,007 B1 | 10/2012 | Langner et al. | |
| 8,320,411 B1 | 11/2012 | Sedarat et al. | |
| 8,331,508 B2 | 12/2012 | Dabiri | |
| 8,472,532 B2 | 6/2013 | Schley-May et al. | |
| 8,625,704 B1* | 1/2014 | Sedarat et al. | 375/285 |
| 2003/0186591 A1 | 10/2003 | Jensen et al. | |
| 2003/0223488 A1* | 12/2003 | Li et al. | 375/232 |
| 2003/0223505 A1 | 12/2003 | Verbin et al. | |
| 2004/0010203 A1* | 1/2004 | Bibian et al. | 600/544 |
| 2004/0023631 A1 | 2/2004 | Deutsch et al. | |
| 2004/0164619 A1 | 8/2004 | Parker et al. | |
| 2004/0213366 A1* | 10/2004 | Ono | 375/348 |
| 2004/0239465 A1 | 12/2004 | Chen et al. | |
| 2004/0252755 A1 | 12/2004 | Jaffe et al. | |
| 2004/0257743 A1 | 12/2004 | Chen et al. | |
| 2005/0018777 A1* | 1/2005 | Azadet | 375/257 |
| 2005/0025266 A1 | 2/2005 | Chan | |
| 2005/0053229 A1 | 3/2005 | Tsatsanis et al. | |
| 2005/0097218 A1 | 5/2005 | Sultenfuss et al. | |
| 2005/0123081 A1 | 6/2005 | Shirani | |
| 2005/0135489 A1 | 6/2005 | Ho et al. | |
| 2005/0203744 A1* | 9/2005 | Tamura | 704/265 |
| 2005/0243483 A1 | 11/2005 | Chen et al. | |
| 2006/0018388 A1 | 1/2006 | Chan | |
| 2006/0056503 A1 | 3/2006 | Keshab et al. | |
| 2006/0159186 A1 | 7/2006 | King | |
| 2006/0182014 A1 | 8/2006 | Lusky et al. | |
| 2006/0256880 A1 | 11/2006 | Frisch | |
| 2007/0014378 A1 | 1/2007 | Parhi et al. | |
| 2007/0081475 A1 | 4/2007 | Telado et al. | |
| 2007/0146011 A1* | 6/2007 | O'Mahony et al. | 326/93 |
| 2007/0192505 A1 | 8/2007 | Dalmia | |
| 2007/0258517 A1 | 11/2007 | Rollings et al. | |
| 2007/0280388 A1* | 12/2007 | Torre et al. | 375/350 |
| 2008/0089433 A1 | 4/2008 | Cho et al. | |
| 2008/0095283 A1 | 4/2008 | Shoor | |
| 2008/0107167 A1* | 5/2008 | Tung et al. | 375/232 |
| 2008/0160915 A1 | 7/2008 | Sommer et al. | |
| 2008/0198909 A1* | 8/2008 | Tsatsanis et al. | 375/219 |
| 2008/0267212 A1 | 10/2008 | Crawley et al. | |
| 2009/0061808 A1 | 3/2009 | Higgins | |
| 2009/0097401 A1 | 4/2009 | Diab | |
| 2009/0097539 A1 | 4/2009 | Furman et al. | |
| 2009/0154455 A1 | 6/2009 | Diab | |
| 2009/0161781 A1* | 6/2009 | Kolze | 375/260 |
| 2010/0046543 A1 | 2/2010 | Parnaby | |
| 2010/0073072 A1* | 3/2010 | Ullen et al. | 327/530 |
| 2010/0074310 A1* | 3/2010 | Roo et al. | 375/219 |
| 2010/0086019 A1 | 4/2010 | Agazzi et al. | |
| 2010/0111202 A1 | 5/2010 | Schley-May et al. | |
| 2010/0159866 A1 | 6/2010 | Fudge et al. | |
| 2011/0032048 A1* | 2/2011 | Wu et al. | 333/12 |
| 2011/0069794 A1* | 3/2011 | Tavassoli Kilani et al. | 375/346 |
| 2011/0106459 A1 | 5/2011 | Chris et al. | |
| 2011/0212692 A1 | 9/2011 | Hahn | |
| 2011/0256857 A1 | 10/2011 | Chen et al. | |
| 2011/0293041 A1* | 12/2011 | Luo et al. | 375/316 |
| 2011/0296267 A1 | 12/2011 | Malkin et al. | |

OTHER PUBLICATIONS

U.S. Appl. No. 12/604,323, filed Oct. 22, 2009, Sedarat et al.
U.S. Appl. No. 12/604,434, filed Oct. 22, 2009, Farjadrad et al.
U.S. Appl. No. 12/604,351, filed Oct. 22, 2009, Sedarat et al.

* cited by examiner

REDUCING ELECTROMAGNETIC INTERFERENCE IN A RECEIVED SIGNAL

FIELD OF THE INVENTION

The invention relates generally to network communications. More particularly, the invention relates to methods and apparatuses for reducing electromagnetic interference in a received signal.

BACKGROUND OF THE INVENTION

High-speed networks are continually evolving. The evolution includes a continuing advancement in the operational speed of the networks. The network implementation of choice that has emerged is Ethernet networks physically connected over unshielded twisted pair wiring. Ethernet in its 10/100BASE-T form is one of the most prevalent high speed LANs (local area network) for providing connectivity between personal computers, workstations and servers.

High-speed LAN technologies include 100BASE-T (Fast Ethernet) and 1000BASE-T (Gigabit Ethernet). Fast Ethernet technology has provided a smooth evolution from 10 Megabits per second (Mbps) performance of 10BASE-T to the 100 Mbps performance of 100BASE-T. Gigabit Ethernet provides 1 Gigabit per second (Gbps) bandwidth with essentially the simplicity of Ethernet. There is a desire to increase operating performance of Ethernet to even greater data rates.

Figure 1:
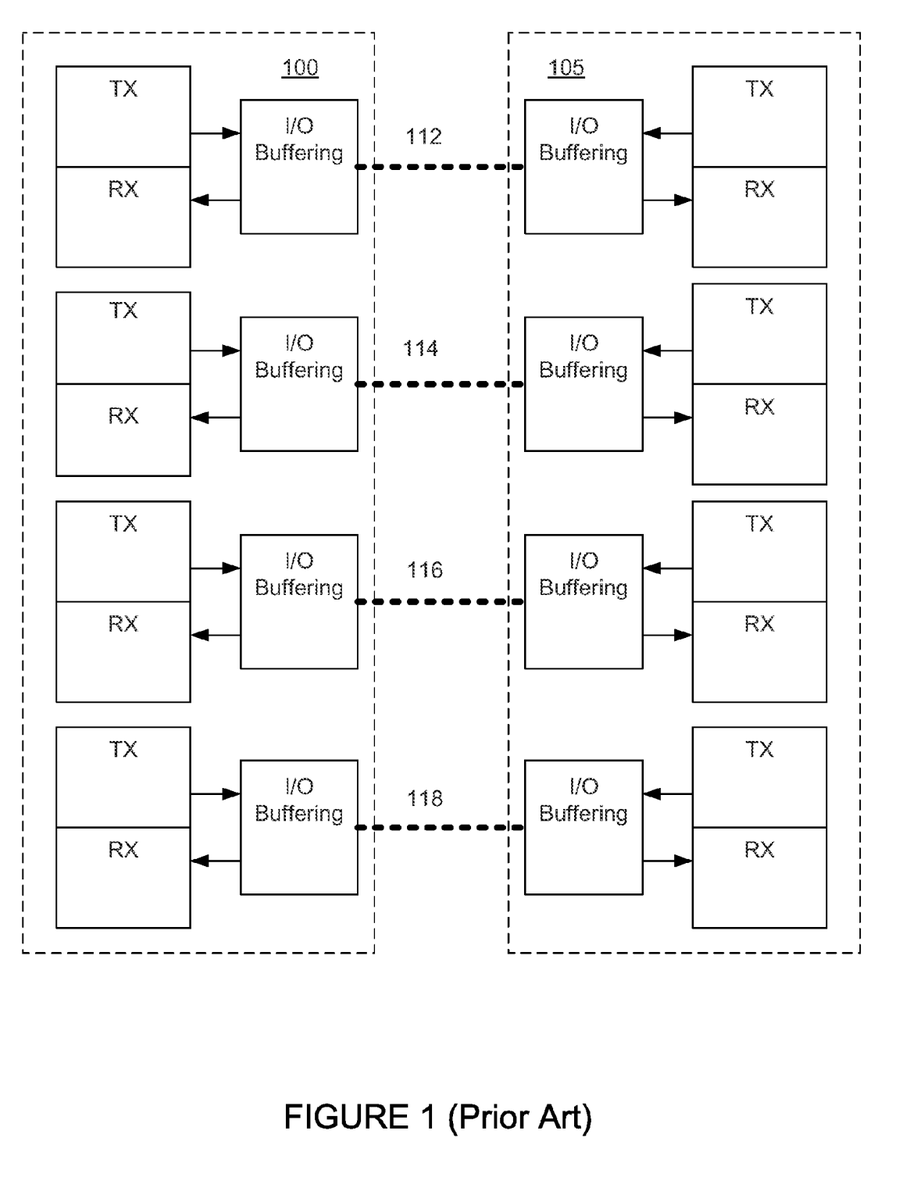
FIG. 1 shows a plurality of prior art Ethernet transceiver pairs.

FIG. 1 shows a block diagram of a pair of Ethernet transceivers communicating over a bi-directional transmission channel, according to the prior art. An exemplary transmission channel includes four pairs of copper wire 112, 114, 116, 118. The transceiver pair can be referred to as link partners, and includes a first Ethernet port 100 and a second Ethernet port 105. Both of the Ethernet ports 100, 105 include four transmitter $T_X$, receiver $R_X$, and I/O buffering sections corresponding to each of the pairs of copper wires 112, 114, 116, 118.

The twisted copper wires can operate as antennas that are susceptible to receive electromagnetic interference (EMI). Generally, the EMI appears as a narrowband interference source to Ethernet receivers. Typically, Ethernet systems mostly rely on EMI protection that is provided by shielding, and by transmitting the information differentially to provide immunity against the common-mode characteristics of the EMI. Higher frequency EMI can be partially rejected by the filtering performed at the analog-front end (AFE) of the Ethernet receiver. Additionally, in the past, Ethernet systems had sufficient operating margin such that the EMI did not cause the link to fail.

However, the immunity of current Ethernet systems (higher frequency systems) to EMI is not sufficient, and the EMI can cause the link to fail, and be unable to transmit data. Suppression of EMI can be extremely challenging since the EMI usually appears at unknown times and with unknown frequency, bandwidth, power, modulation, duration, etc. Additionally, suppressing the EMI when the link is already transmitting data is extremely difficult since the EMI characteristics need to be determined very fast to be able to cancel the EMI before the link fails. Moreover, there is no training data to help detect and cancel the EMI since the link is transmitting real traffic.

It is desirable to have an apparatus and method for suppressing EMI of Ethernet systems to provide reliable link operation.

SUMMARY OF THE INVENTION

An embodiment includes a method of reducing electromagnetic interference of a received signal. A signal is received over at least two conductors. A common-mode signal is extracted from the at least two conductors. The common-mode signal is processed and summed with the received signal, thereby reducing electromagnetic interference of the received signal.

Another embodiment includes a transceiver. The transceiver includes a receive port operative to receive a signal over at least two conductors, means for extracting a common-mode signal from the at least two conductors, a processor operative to process the common-mode signal, and a canceller operative to sum the processed common-mode signal with the received signal to reduce electromagnetic interference of the received signal.

Another embodiment includes another method of reducing electromagnetic interference of a received signal. A signal is received over at least two conductors. A common-mode signal is extracted from the at least two conductors. Electromagnetic interference of the received signal is reduced using notch filtering, wherein the notch filtering is based at least in part on the processed common-mode signal.

Another embodiment includes another method of reducing electromagnetic interference of a received signal. A signal is received over at least two conductors. A common-mode signal is extracted from the at least two conductors. Electromagnetic interference of the received signal is reduced using slicer error feedback, wherein the slicer-error feedback filtering is based at least in part on the processed common-mode signal.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

The described embodiments are readily understood by the following detailed description in conjunction with the accompanying drawings, wherein like reference numerals designate like structural elements, and in which.

DETAILED DESCRIPTION

As shown in the drawings for purposes of illustration, the invention is embodied in an apparatus and methods for reducing electromagnetic interference of a received signal of a transceiver. The descriptions provided are generally focused on Ethernet transceivers, but the described embodiments can be used in other configurations of transceivers as well. It is to be understood that the electromagnetic signals can take different forms. That is the electromagnetic signals can couple into the receive signals wirelessly, through cables, through circuit boards, and/or through power supplies.

Figure 2:
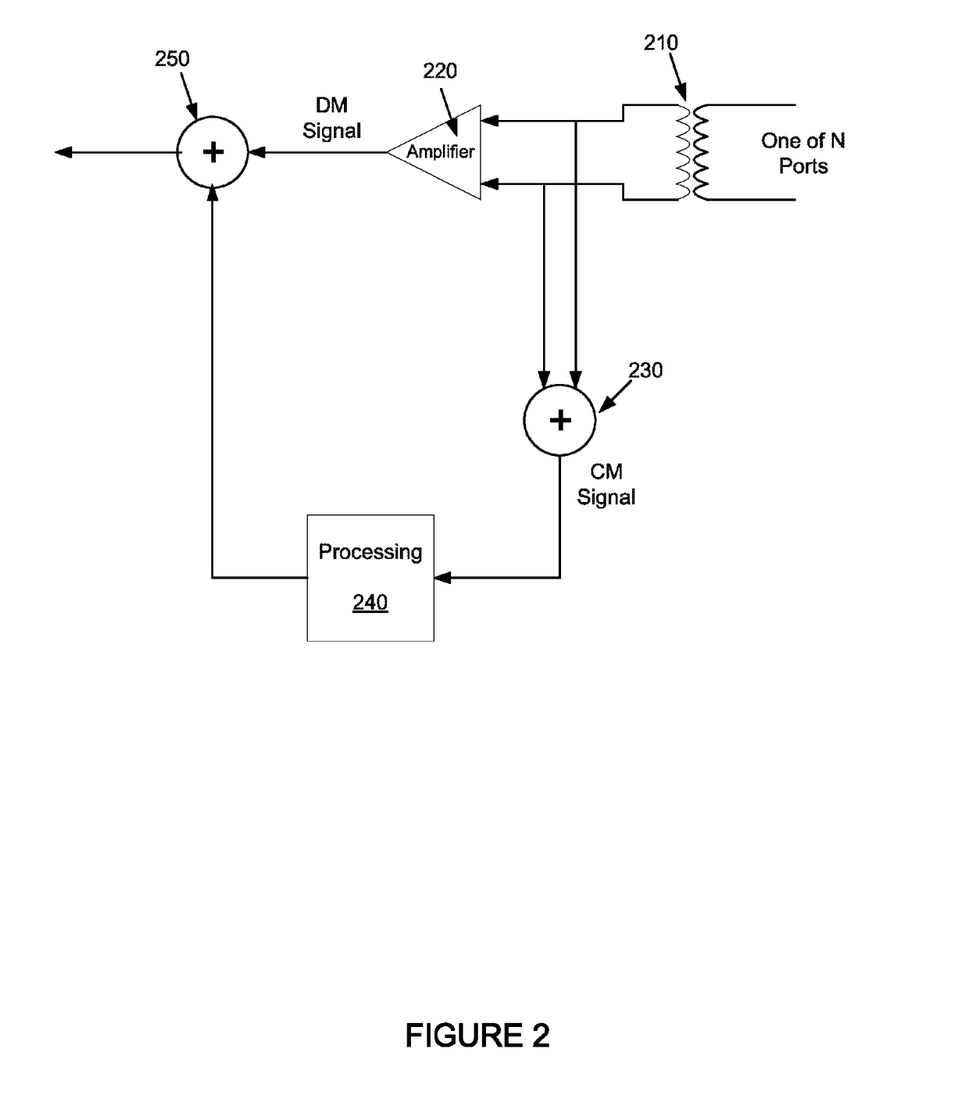
FIG. 2 shows a block diagram of an example of a transceiver that can utilize the described embodiments for reducing electromagnetic interference of a received signal.

FIG. 2 shows a block diagram of an example of a transceiver that can utilize the described embodiments for reducing electromagnetic interference of a received signal. This embodiment includes N receiver ports, which as shown, can include a transformer 210. The transformer can be connected, for example, to a pair of copper wires, wherein four transformers are connected to four pairs of wires. Each of the receive signals includes an intended receive differential signal. However, the received signals typically include electromagnetic interference which typically includes both differential mode (DM) components and common mode (CM) components.

For this embodiment, a CM signal is generated by summing signals received from a pair of conductors (such as a pair of copper wires) at a summer 230. It should be noted that various methods can be used to extract the CM signal. For example, an embodiment includes tapping a center-tap of a transformer. Other methods can include extracting the CM signal before the transformer. The common mode signal is processed by processing circuitry 240. The differential mode signal is typically amplified by a programmable gain amplifier (PGA) 220. A summer (or canceller) 250 sums the received differential signal with the processed common mode signal to cancel at least a portion of the electromagnetic interference of the received differential signal. It is to be understood that EMI cancellation can be repeated for each of the N received signals, and that the CM signal processing can be different for each of the N received signals. Embodiments include converting the CM signal to a differential mode (DM) signal before, during or after the CM signal processing.

Effectively, the embodiment of FIG. 2 is an EMI canceller that is used to cancel EMI in, for example, a full-duplex Ethernet system. The cancellation process involves detecting the presence of the EMI, determining its characteristics, and then canceling the EMI. The EMI detection process relies on measuring the characteristics of various signals that are related to the EMI using, for example, power-meters or processing the outputs of a transform, such as a fast-Fourier-transform (FFT), performed on signals that have information about the EMI. The sensed CM signal can also be used to detect the presence of an EMI that afflicts the receive signal.

Figure 3:
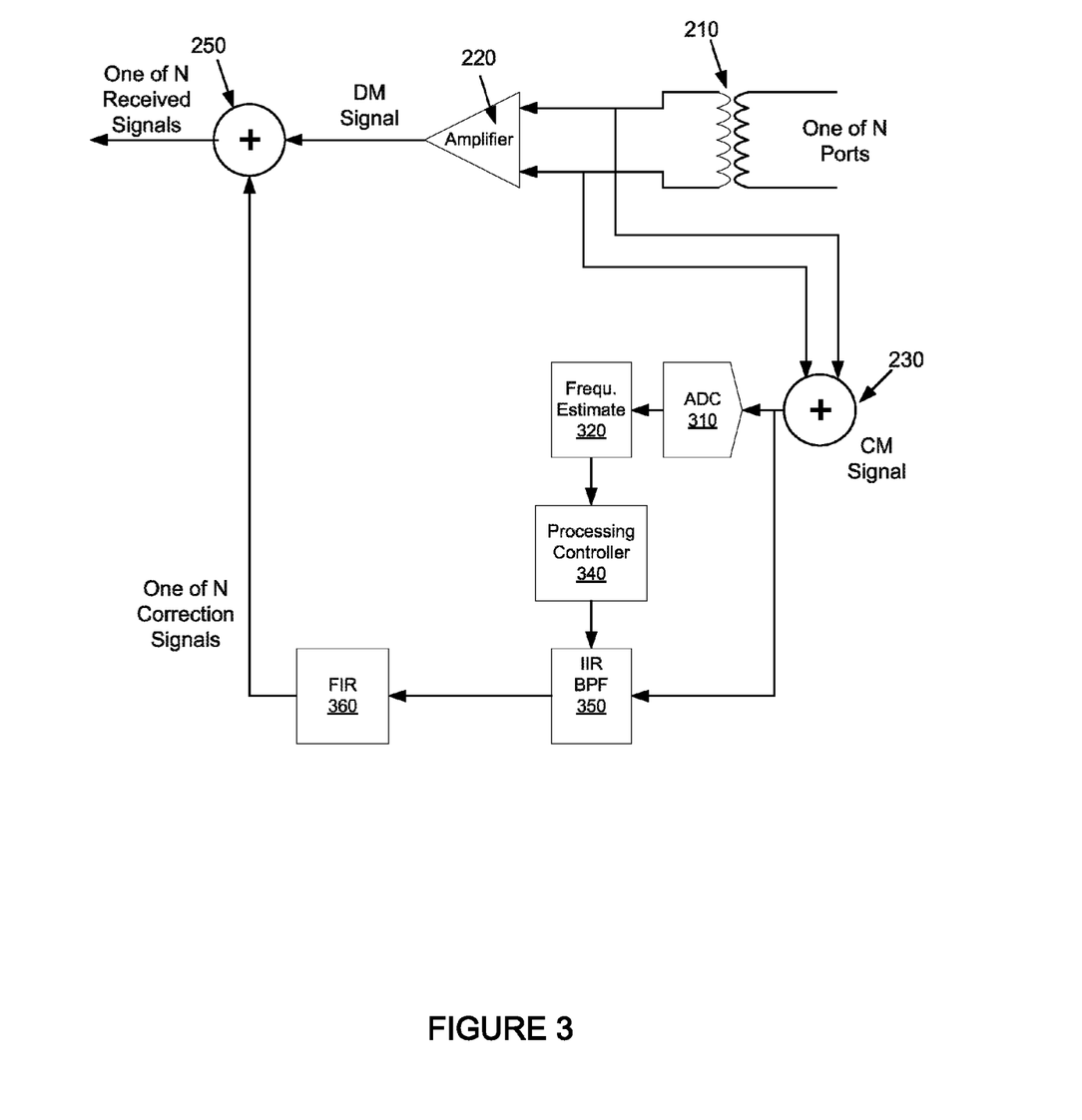
FIG. 3 shows another block diagram of an example of a transceiver that can utilize the described embodiments for reducing electromagnetic interference of a received signal.

FIG. 3 shows another block diagram of an example of a transceiver that can utilize the described embodiments for reducing electromagnetic interference of a received signal. This embodiment shows additional details of an implementation of the CM signal processing.

As shown, an ADC (analog to digital converter) 310 samples the CM signal. A frequency estimator 320 estimates a frequency of at least one frequency component of the CM signal.

The frequency estimator 320 can employ multiple methods for EMI frequency estimation. Possible methods include time-domain methods, filter bank structures, linear prediction methods, frequency-domain interpolation methods, iterative detection and estimation, and many more methods.

The frequency estimate is used by a controller 340 to generate filter components (coefficients) of a band-pass filter 350. An embodiment of the band-pass filter includes an IIR (infinite impulse response) filter. For an embodiment, the band-pass filter 350 is tuned to have a pass-band that is centered at the estimated frequency of the electromagnetic interference. The controller 340 selects the filter components to define the center frequency and bandwidth of the band-pass filter 350.

For an embodiment, the band-pass filtered CM signal is additionally filtered by, for example, an FIR (finite impulse response) filter 360. The output of the filter 360 is summed with the received signal to cancel at least a portion of the electromagnetic interference.

Figure 4:
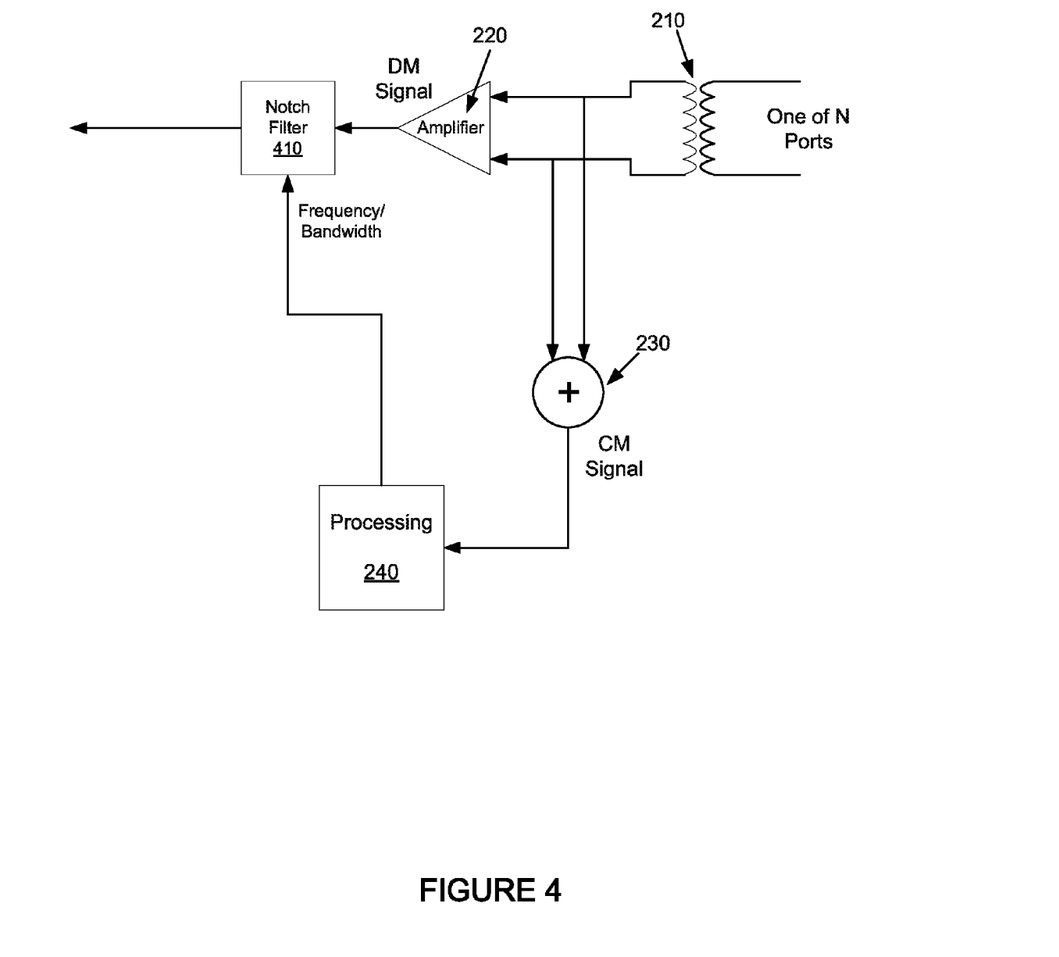
FIG. 4 shows another block diagram of an example of a transceiver that can utilize the described embodiments for reducing electromagnetic interference of a received signal.

FIG. 4 shows another block diagram of an example of a transceiver that can utilize the described embodiments for reducing electromagnetic interference of a received signal. This embodiment further includes a notch filter 410 for directly notch filtering out at least a portion of the electromagnetic interference in the received differential signal. As shown, components of the notch filter 410 can be determined at least in part by the processor 240. More specifically, the estimated frequency of at least one electromagnetic interference source can be estimated as previously described. This frequency estimate can be used to influence the center frequency and bandwidth of the notch filter 410, and thereby cancel at least a portion of the electromagnetic interference.

Figure 5:
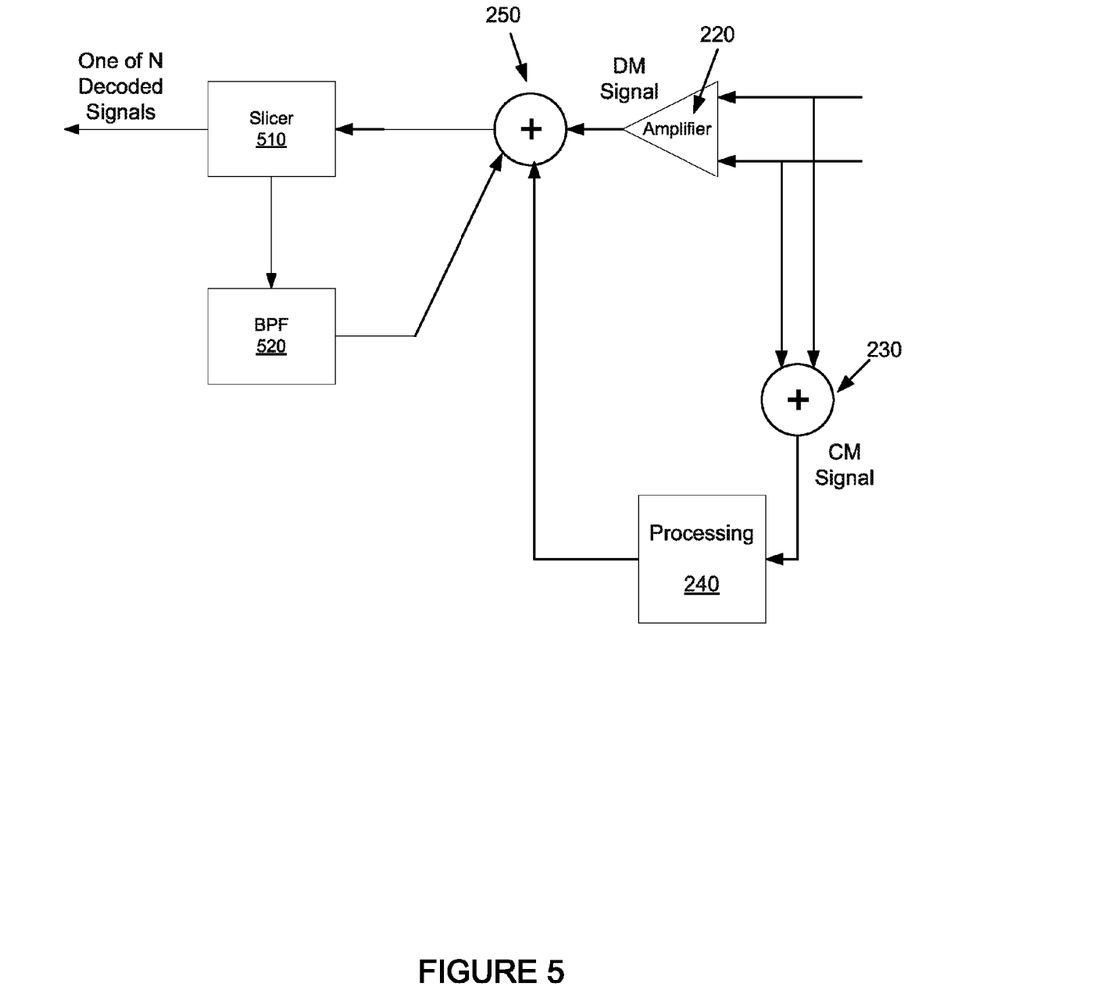
FIG. 5 shows another block diagram of an example of a transceiver that can utilize the described embodiments for reducing electromagnetic interference of a received signal.

FIG. 5 shows another block diagram of an example of a transceiver that can utilize the described embodiments for reducing electromagnetic interference of a received signal. This embodiment additionally includes a slicer 510. The slicer 510 decodes the receive signal and additionally generates an error signal. The error signal can be filtered with a band-pass filter 520 and the output of the filter 520 can be summed at, for example, the summer 250 to reduce at least a portion of the electromagnetic interference or some other narrowband distortion that was generated as part of the process of canceling the EMI (for example, narrowband common-mode return loss, narrowband ISI caused by notching, etc). The band-pass filter 520 can be configured base at least in part upon the estimated frequency of the electromagnetic interference.

The slicer makes decisions about the transmitted information, and can include channel decoding, multi-dimensional decoding, or just single dimensional symbol-by-symbol decoding. The slicer decision is used to generate an estimate of the other signals present in the received signal besides the transmitted information. As such, the EMI signal present in the received signal will be contained in the slicer error. This slicer error could then be processed, or filtered by the band-pass filter 520, to generate an estimate of the EMI signal. The EMI signal estimate based on the processed slicer error could then be subtracted from the received signal to cancel at least a portion of the EMI in the received signal.

Figure 6:
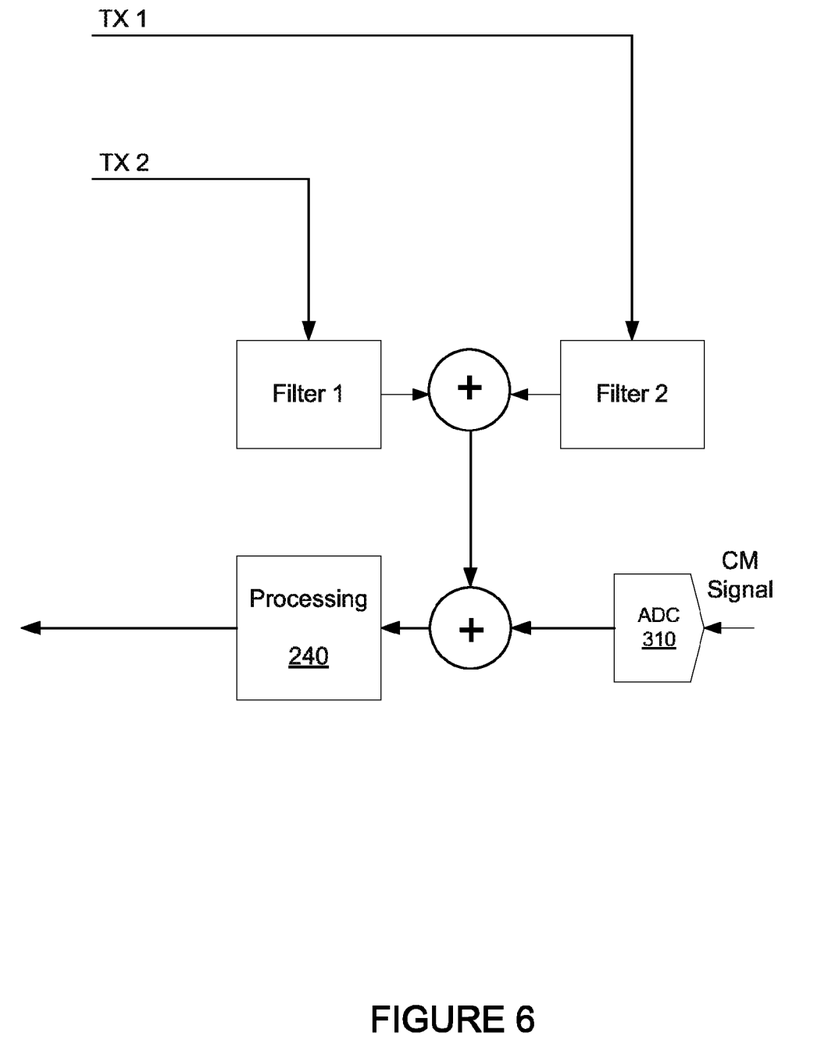
FIG. 6 shows is block diagram of an example of a transceiver that can utilize the described embodiments for reducing electromagnetic interference in a received signal, and additionally reduce transmit signal components of the received CM signal.

FIG. 6 shows a block diagram of an example of a transceiver that can utilize the described embodiments for reducing electromagnetic interference of a received signal, and additionally reduce transmit signal components of the received CM signal. Full duplex transmission can result in at least a portion of the transmit signal being coupled back into the receive CM signal. The portion of the transmit signal that couples back is referred to as a CM return-loss (RL) signal. It can be desirable to reduce a level of components of a transmit signal within the extracted common-mode signal. For an embodiment, reducing the level of components of the transmit signal within the extracted common-mode signal includes the transmit signals and summing the filtered transmit signals with the common-mode signal.

FIG. 6 includes a first filter (Filter 1) and a second filter (Filter 2). The first filter receives a first transmission signal (TX 1), and the second filter receives a second transmission signal (TX 2). The configuration (coefficients) of the first filter can be selected to estimate the CMRL signal contribution of the first transmission signal (TX 1), and the configuration (coefficients) of the second filter can be selected to estimate the CMRL contribution of the second transmission signal (TX 2). The first and second echo signal estimates can be summed with the CM signal to reduce at least a portion of the echo signal components within the CM signal.

Figure 7:
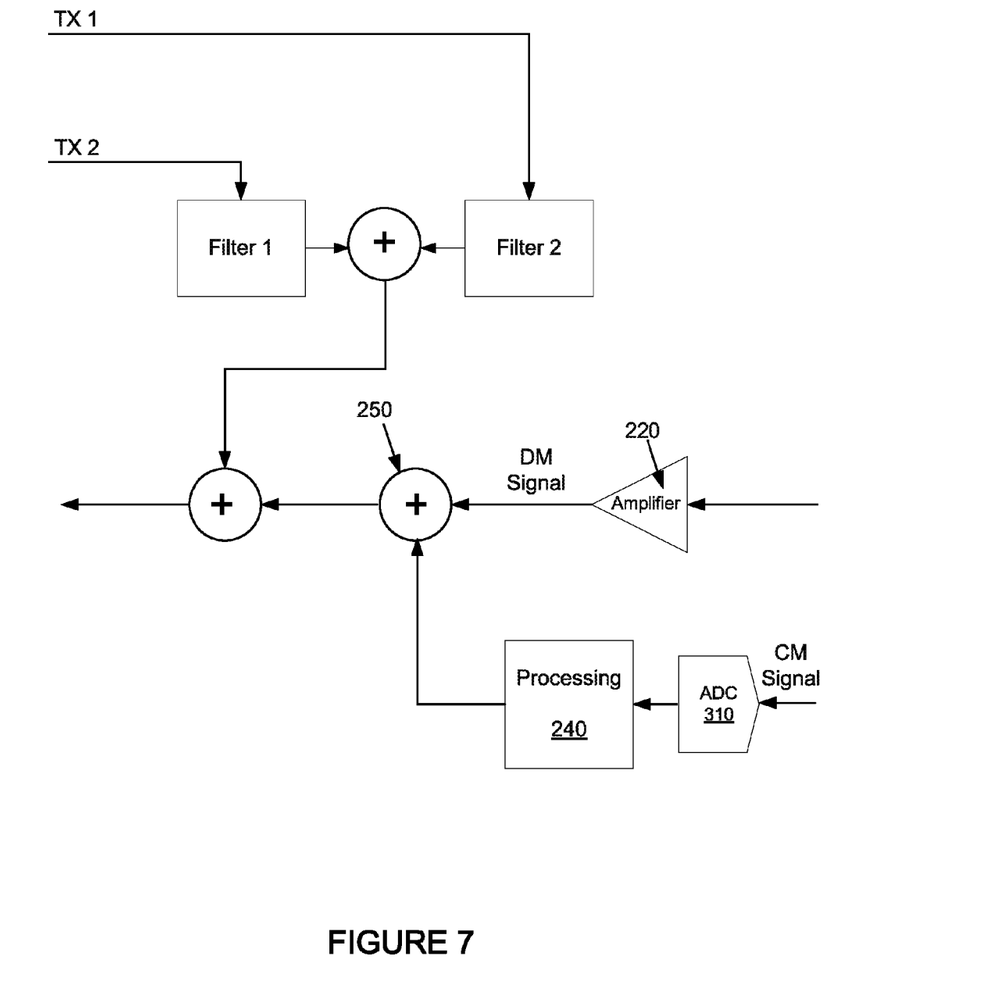
FIG. 7 shows is block diagram of another example of a transceiver that can utilize the described embodiments for reducing electromagnetic interference in a received signal, and additionally reduce transmit signal components of the received CM signal.

FIG. 7 shows a block diagram of another example of a transceiver that can utilize the described embodiments for reducing electromagnetic interference in a received signal, and additionally reduce transmit signal components of both the received CM signal and the received differential signal. FIG. 7 also includes a first filter (Filter 1) and a second filter (Filter 2). The first filter receives a first transmission signal (TX 1), and the second filter receives a second transmission signal (TX 2). The configuration (coefficients) of the first filter processing the first transmission signal (TX 1) can be selected to jointly estimate the CMRL signal components in the CM signal and the transmit signal components in the received differential signal. The configuration (coefficients) of the second filter processing the second transmission signal (TX 2) can be selected to jointly estimate the CMRL signal components in the CM signal and the transmit signal components in the received differential signal. The first and second echo signal estimates can be summed with the summed processed common-mode signal and received signal to reduce transmit signal components in the summed signal.

Figure 8:
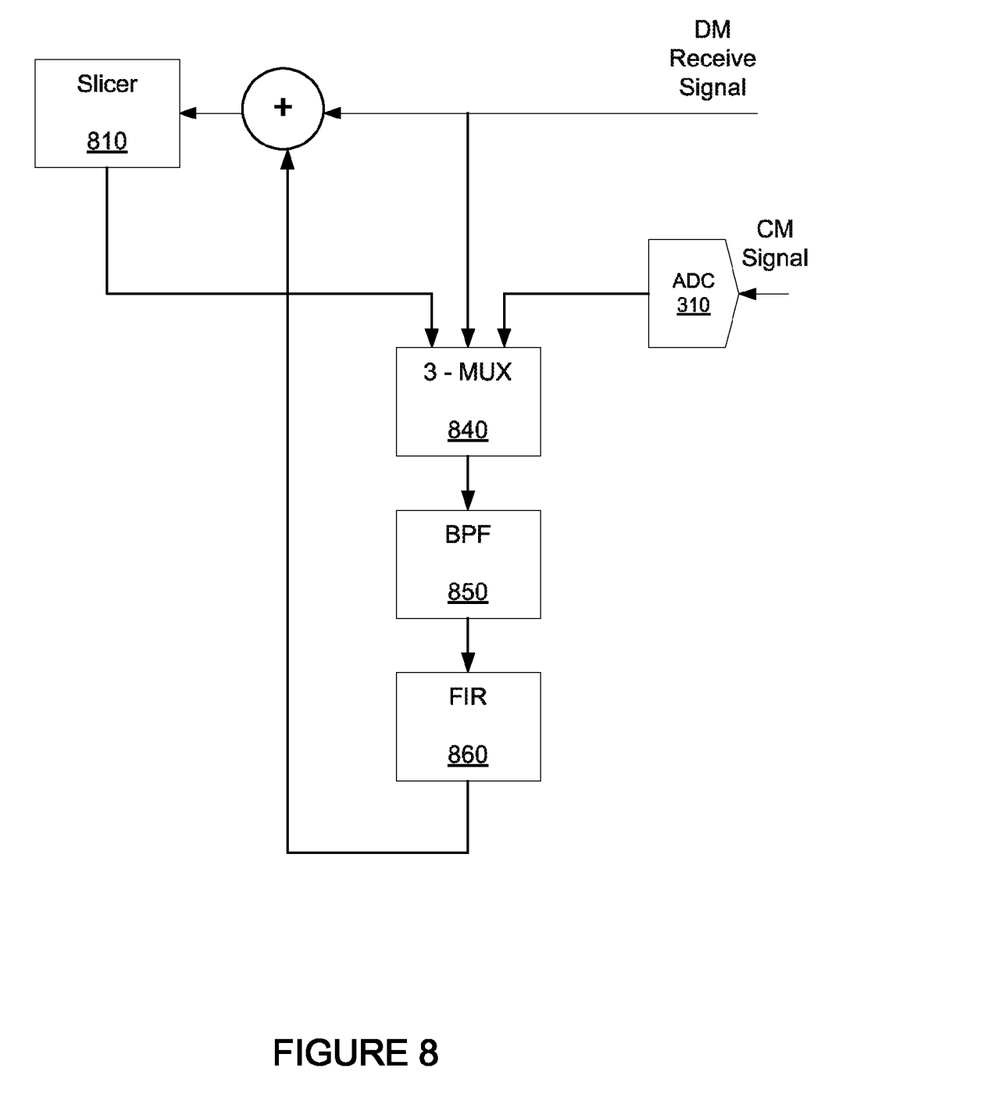
FIG. 8 shows another block diagram of an example of a transceiver that can utilize the described embodiments for reducing electromagnetic interference of a received signal, and further provides reuse of processing circuitry.

FIG. 8 shows another block diagram of an example of a transceiver that can utilize the described embodiments for reducing electromagnetic interference of a received signal, and further provides reuse of processing circuitry. The various embodiments described include various forms of band-pass filtering and FIR filtering. An embodiment includes a utilization of common hardware in the implementation of the various band-pass (typically, IIR) and the FIR filtering. A MUX 840 provides selectivity between filtering the CM signal, the DM received signal and the slicer error (from slicer 810) with a band-pass filter 850 and an FIR 860. By using common hardware (electronic circuitry) for the filtering, power and space savings can be realized.

Figure 9:
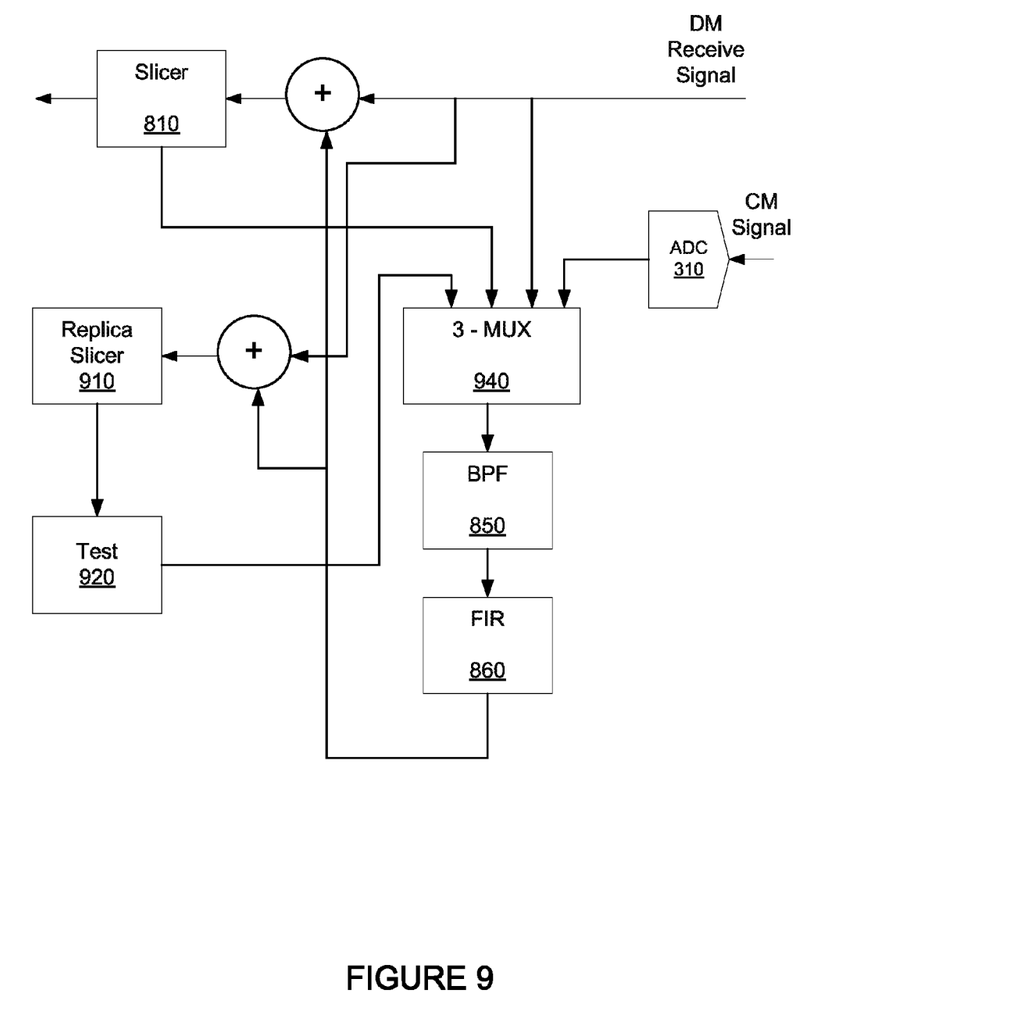
FIG. 9 shows another block diagram of an example of a transceiver that can utilize the described embodiments for reducing electromagnetic interference of a received signal, and further provides reuse of processing circuitry, and includes a replica slicer.

FIG. 9 shows another block diagram of an example of a transceiver that can utilize the described embodiments for reducing electromagnetic interference of a received signal, and further provides reuse of processing circuitry, and includes a replica slicer 910. The replica slicer 910 can provide an independent "test output" in which the slicer error can be monitored or tested for different setting of configurations of the various band-pass and FIR filters or for use in improving the estimated frequency of the EMI. The output of the replica slicer 910 is independent of the decoding and slicer error of the slicer 810. Test circuitry 920 can monitor the output of the replica slicer 910, aiding in the selections of the configurations of the various band-pass and IIR filters. The proper selections should reduce the slicer error. The MUX 940 additionally receives an output of the test circuitry 920.

Figure 10:
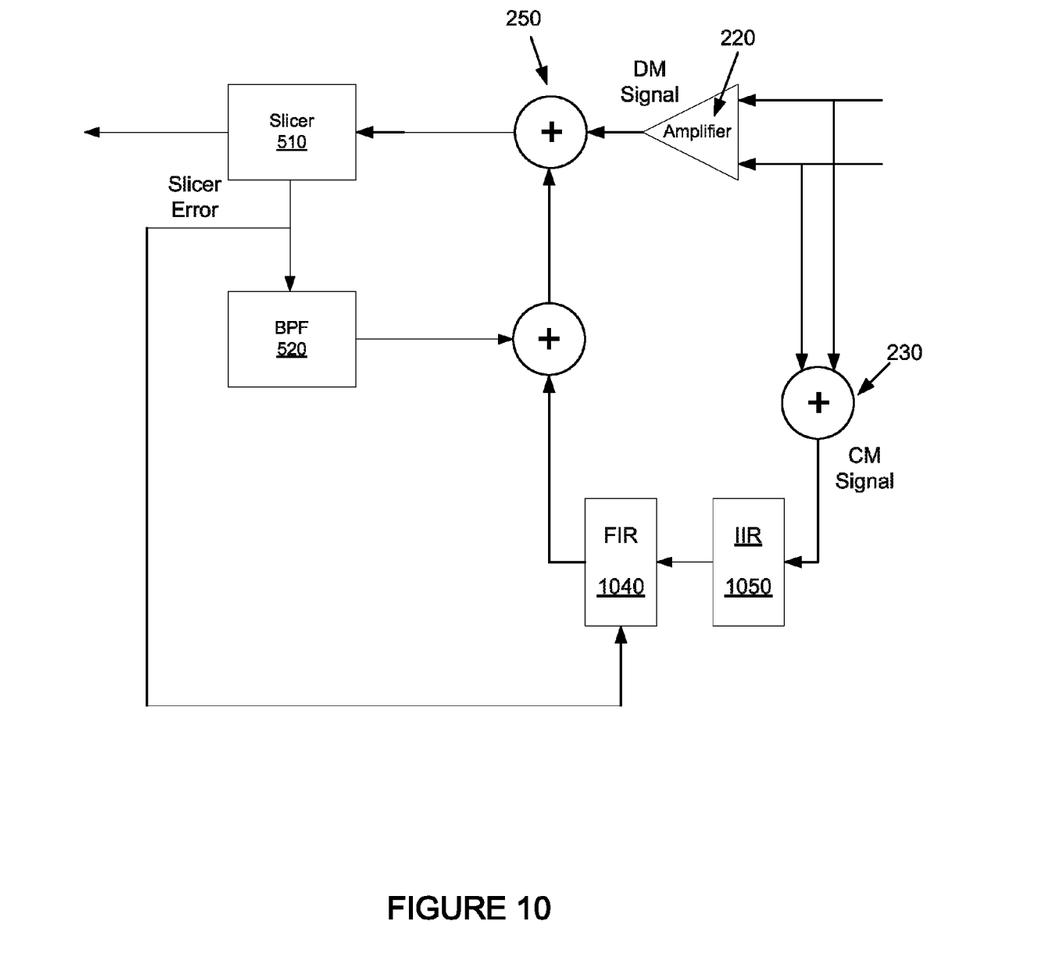
FIG. 10 shows another block diagram of an example of a transceiver that can utilize the described embodiments for reducing electromagnetic interference of a received signal.

FIG. 10 shows another block diagram of an example of a transceiver that can utilize the described embodiments for reducing electromagnetic interference of a received signal. The embodiment includes the slicer error (after being band-pass filtered) of the slicer 510 being summed with the filtered (processed) common mode signal, and for aiding in the configuration and/or adaptive training of the FIR filter of the common mode signal. As previously shown and described, the CM signal is passed through an IIR filter 1050 and an FIR filter 1040. The configuration and/or adaptive training of the FIR 1040 are controlled at least in part by the slicer error. The control should reduce the slicer error.

Figure 11:
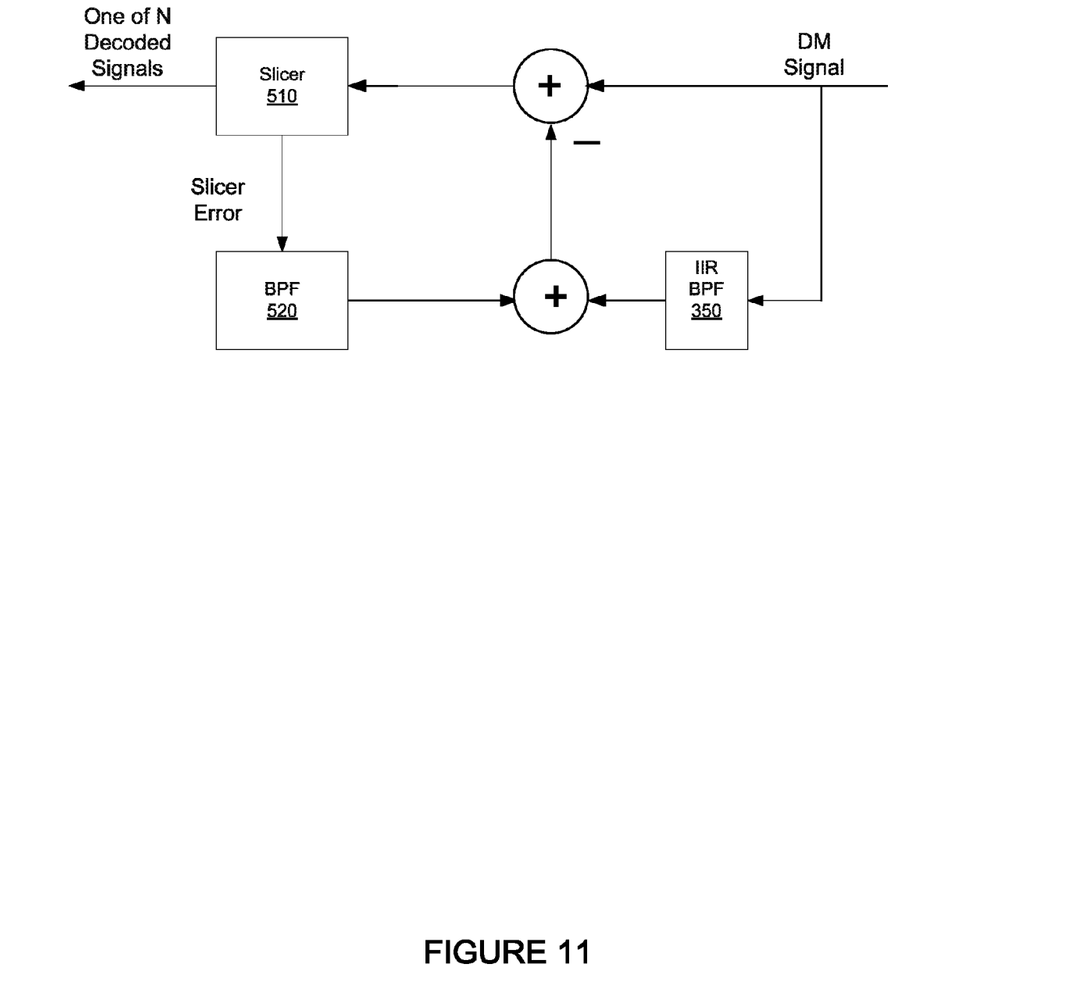
FIG. 11 shows another block diagram of an example of a transceiver that can utilize the described embodiments for reducing electromagnetic interference of a received signal.

FIG. 11 shows another block diagram of an example of a transceiver that can utilize the described embodiments for reducing electromagnetic interference of a received signal. This embodiment does not include the common mode signal processing. The embodiment includes reducing the electromagnetic interference through a combination of band-pass filtering (IIR Band-Pass Filter 350) the received (differential mode) signal and IIR/band-pass filtering (Band-Pass Filter 520) of the slicer error. The band-pass filtered received signal is negatively summed with the received signal to cancel at least a portion of the electromagnetic interference. The band-pass filters of the received signal and of the slicer error signal are tuned to the frequency of the electromagnetic interference.

Figure 12:
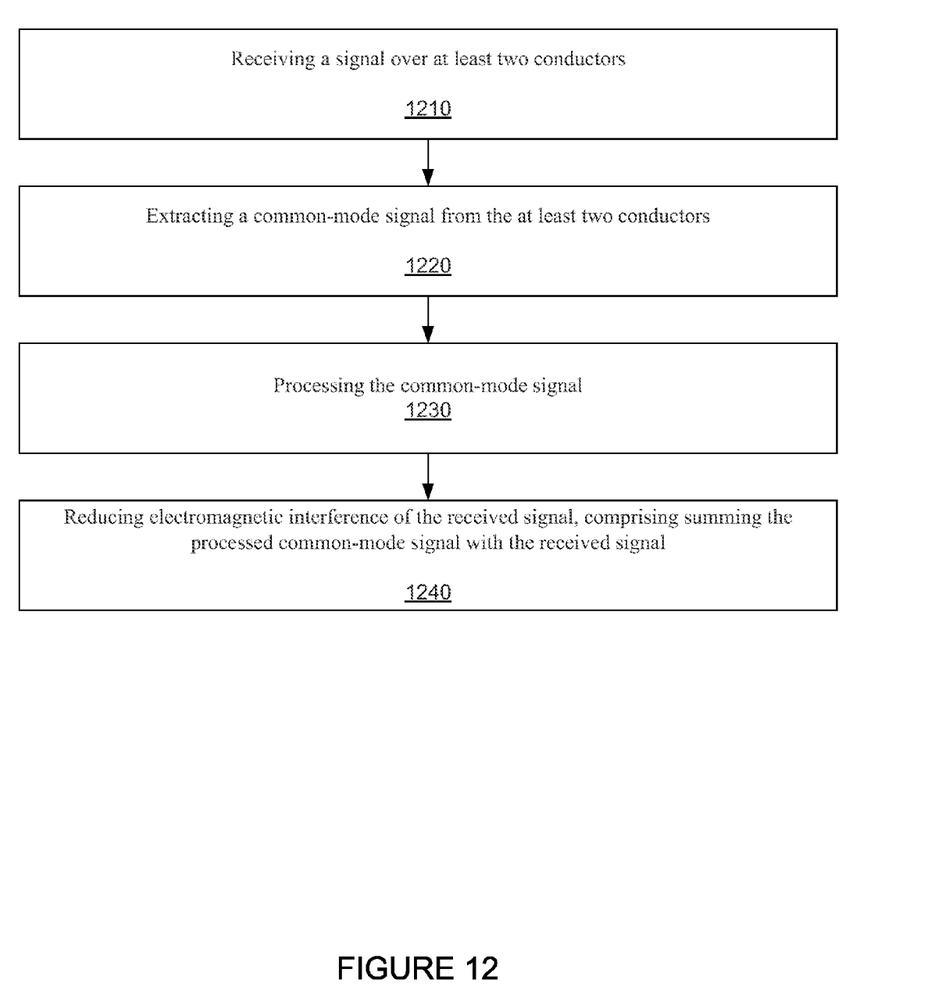
FIG. 12 is a flow chart that includes an example of steps of a method of reducing electromagnetic interference of a received signal.

FIG. 12 is a flow chart that includes an example of steps of a method of reducing electromagnetic interference of a received signal. A first step 1210 includes receiving a signal over at least two conductors. A second step 1220 includes extracting a common-mode signal from the at least two conductors. A third step 1230 includes processing the common-mode signal. A fourth step 1240 includes reducing electromagnetic interference of the received signal, comprising summing the processed common-mode signal with the received signal.

For an embodiment, a frequency of the electromagnetic interference signal is estimated based on the common-mode signal. The above-described processing can utilize the frequency of the electromagnetic interference signal. More specifically, for an embodiment, the processing includes configuring a band-pass filter based upon the frequency of the electromagnetic interference signal, and wherein processing the common-mode signal comprises filtering the common mode signal with the band-pass filter. For a specific embodiment, the band-pass filter comprises an infinite impulse response filter. A center frequency, a bandwidth and a gain of the band-pass filter is based on the extracted common-mode signal. More specifically, the band-pass filter is configured based on the extracted common-mode signal by estimating at least one of a strength, a bandwidth, or noise level of the extracted common mode signal, or an estimate of an accuracy of the estimate of the frequency of the electromagnetic interference signal.

For an embodiment, the band-pass common mode signal is further processed by filtering the band-pass filtered common mode signal with N finite impulse response filters, generating a filtered output for each of N signals received over N of the at least two conductors (for example, twisted pairs of copper wire). Each of the N finite impulse response filters is adapted based on a corresponding differential signal of the received signal that includes the electromagnetic interference. Each of the N filtered outputs can be summed with a corresponding one of N signals received over N at least two conductors.

As previously described, an embodiment further includes notch filtering the receive signal, wherein a center frequency, bandwidth and/or gain of the notch filter is based on an estimate of a frequency of an electromagnetic interference signal. For an embodiment, the estimate of the frequency of the electromagnetic interference signal is based on the common-mode signal.

As previously described, an embodiment further includes determining an error of a slicer that decodes the receive signal and cancelling the electromagnetic interference based on the error. For a specific embodiment, the error is used to cancel the electromagnetic interference if the error is below a threshold. For embodiments, the presence of EMI, the frequency, the amplitude, and other EMI properties are determined based on the slicer error. The slicer makes decisions about the transmitted information, and thus the slicer error includes the other receive signals besides the transmitted information. The EMI signal present in the received differential signal is part of the slicer error, and processing the slicer error can therefore be used to detect the presence of the EMI signal, and determine its characteristics. The frequency of the EMI signal can be determined by determining strong frequency components in the slicer error using, for example, fast-Fourier-transform (FFT) processing to examine the frequency domain content of the slicer error signal.

As previously described, an embodiment further includes reducing a level of components of a transmit signal within the extracted common-mode signal. For a specific embodiment, reducing the level of components of the transmit signal within the extracted common-mode signal includes filtering the transmit signal and summing the filtered transmit signal with the common-mode signal.

The electromagnetic interference can include multiple sources of interference that include multiple interfering frequencies. An embodiment additionally includes estimating frequencies of multiple electromagnetic interference signals, and adapting band-pass filter configurations based at least in part on the frequencies.

An embodiment includes utilization of common hardware in the implementation of the various band-pass (typically, IIR) and the FIR filtering. Specifically, this embodiment includes estimating a frequency of the electromagnetic interference signal based on the common-mode signal, notch filtering the receive signal, wherein a center frequency of the notch filter is based on the estimate of a frequency of an electromagnetic interference signal. Further, determining an error of a slicer that decodes the receive signal, filtering the error and cancelling the electromagnetic interference based on the filtered error. Further, configuring a band-pass filter based upon the estimate of the frequency of the electromagnetic interference signal, and wherein processing the common-mode signal comprises filtering the common mode signal with the band-pass filter, wherein the notch filter, error filtering and the band-pass filter share filtering circuit hardware. With different combinations of filtering in place and easy to reconfigure, an embodiment include a replica slicer generating a replica slicer error for testing different combinations of the notch filtering, the error filtering and the common mode filtering.

A Network of Devices

Figure 13:
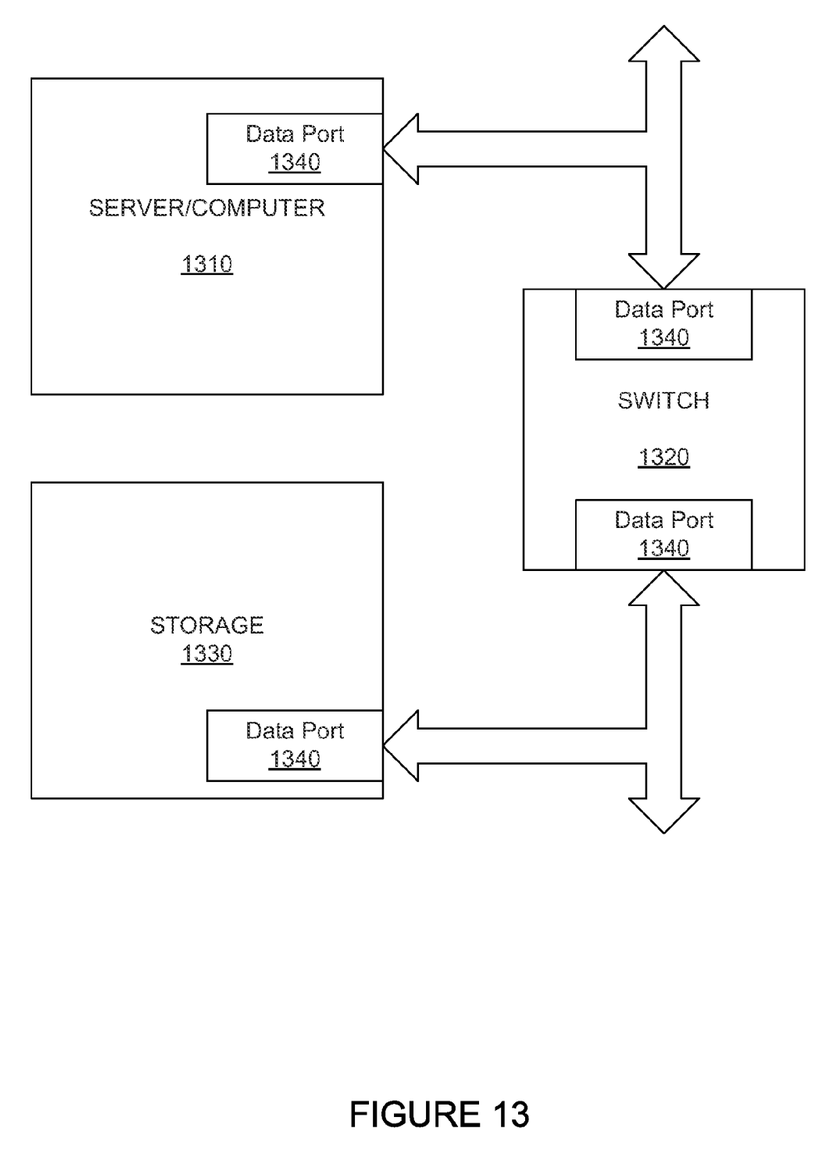
FIG. 13 shows devices connected to an Ethernet network that can include embodiments of reducing electromagnetic interference of a received signal.

FIG. 13 shows devices connected to an Ethernet network that can include embodiments of reducing electromagnetic interference of a receive signal of a transceiver. The network includes a server/computer 1310, a switch 1320 and storage 1330 that can all benefit from reducing electromagnetic interference of a receive signal of a transceiver 1340. The server/computer 1310 can be connected to the switch 1320 through an Ethernet twisted pair LAN connection. The switch 1320 can additionally be connected to the storage 1330 through an Ethernet twisted pair LAN connection. The transceivers 1340 within the server/computer 1310, the switch 1320, and the storage 1330 can provide reduction electromagnetic interference.

Although specific embodiments of the invention have been described and illustrated, the invention is not to be limited to the specific forms or arrangements of parts so described and illustrated. The invention is limited only by the appended claims.

What is claimed:

1. A method of reducing electromagnetic interference of a received signal, comprising:
   receiving a signal over at least two conductors, the at least two conductors defining one of a plurality of physical channels for an Ethernet transceiver circuit;
   extracting a common-mode signal from the at least two conductors;
   processing the common-mode signal;
   estimating a frequency of the electromagnetic interference to generate a cancellation signal by filtering the common-mode signal with an infinite impulse response (IIR) filter;
   notch filtering the receive signal, wherein a center frequency of the notch filter is based on the estimate of the frequency of the interference signal; and
   reducing the electromagnetic interference of the received signal by summing the cancellation signal with the received signal after notch filtering.

2. The method of claim 1, further comprising configuring a center frequency, a bandwidth and a gain of the IIR filter based on the extracted common-mode signal.

3. The method of claim 2, wherein configuring the IIR filter based on the extracted common-mode signal comprises estimating at least one of a strength, a bandwidth, or noise level of the extracted common mode signal, or estimating an accuracy of the estimate of the frequency of the electromagnetic interference signal.

4. The method of claim 1, wherein processing the common-mode signal further comprises filtering the common mode signal with N finite impulse response filters, generating a filtered output for each of N signals received over N of the at least two conductors.

5. The method of claim 4, wherein each of the N finite impulse response filters is adapted based on a corresponding differential signal of the received signal that includes the electromagnetic interference.

6. The method of claim 5, further comprising summing each of the N filtered outputs with a corresponding one of N signals received over N at least two conductors.

7. The method of claim 1, further comprising determining an error of a slicer that decodes the receive signal and wherein extracting the common-mode signal includes estimating the common-mode signal based on the slicer error and cancelling the electromagnetic interference based on the error.

8. The method of claim 7, wherein the error is used to cancel the electromagnetic interference if the error is below a threshold.

9. The method of claim 1, further comprising determining an error of a slicer that decodes the receive signal, and wherein an estimate of the frequency of the electromagnetic interference signal is based on the error of the slicer.

10. The method of claim 1, further comprising reducing a level of components of a transmit signal within the extracted common-mode signal.

11. The method of claim 10, wherein reducing the level of components of the transmit signal within the extracted common-mode signal comprises filtering the transmit signal and summing the filtered transmit signal with the common-mode signal.

12. The method of claim 1, further comprising reducing a level of components of a transmit signal within the summed processed common-mode signal and received signal.

13. The method of claim 1, further comprising estimating frequencies of multiple interference signals, and adapting IIR filter configurations based at least in part on the frequencies.

14. The method of claim 1, further comprising:
determining an error of a slicer that decodes the receive signal;
an error filter filtering the error and cancelling the electromagnetic interference based on the filtered error;
wherein
the notch filter, error filter and the band-pass filter share filtering circuit hardware.

15. The method of claim 14, further comprising a replica slicer generating a replica slicer error for testing different combinations of the notch filtering, the error filtering and the common mode filtering.

16. An Ethernet transceiver comprising:
a receive port operative to receive a signal having signal components over at least two conductors;
a summer for summing the signal components and extracting a common-mode signal from the at least two conductors;
a processor operative to process the common-mode signal;
an infinite impulse response (IIR) filter operative to filter the common-mode signal to generate a cancellation signal, wherein the IIR filter is configured based upon a frequency of an interference signal;
a notch filter, the notch filter filtering the receive signal, wherein a center frequency of the notch filter is based on an estimate of the frequency of the interference signal; and
a canceller operative to sum the cancellation signal with the received signal after notch filtering to reduce electromagnetic interference of the received signal.

17. The transceiver of claim 16, further comprising N finite impulse response filters, each of the N finite impulse response filters receiving an output of the IIR filter and generating a filtered output for each of N signals received over N of the at least two conductors.

18. The transceiver of claim 17, wherein each of the N finite impulse response filters is adapted based on a corresponding differential signal of the received signal that includes the electromagnetic interference.

19. The transceiver of claim 18, further comprising a summer that sums each of the N filtered outputs with a corresponding one of N signals received over N at least two conductors.

20. The transceiver of claim 16, further comprising:
a slicer, the slicer decoding the receive signal and generating a slicer error;
a canceller for cancelling the electromagnetic interference with the slicer error.

21. The transceiver of claim 16, further comprising:
a notch filter for filtering the receive signal, wherein a center frequency of the notch filter is based on an estimate of a frequency of an electromagnetic interference signal;
a slicer for decoding the filtered receive signal and generating a slicer error;
a filter for filtering the slicer error;
a canceller for summing the receive signal and the slicer error for cancelling at least a portion of electromagnetic interference;
and
the canceller additionally summing the filtered common mode signal with the filtered receive signal for cancelling at least a portion of electromagnetic interference.

* * * * *